Jan. 3, 1956 M. CAMRAS 2,729,453

MAGNETIC RECORDING AND REPRODUCING APPARATUS

Filed Jan. 13, 1950 6 Sheets-Sheet 1

Inventor
Marvin Camras

By The firm of Charles W. Hills Attys

Jan. 3, 1956

M. CAMRAS 2,729,453

MAGNETIC RECORDING AND REPRODUCING APPARATUS

Filed Jan. 13, 1950

6 Sheets-Sheet 2

Inventor
Marvin Camras

By The Firm of Charles W. Hills Attys

MAGNETIC RECORDING AND REPRODUCING APPARATUS

Filed Jan. 13, 1950 6 Sheets-Sheet 3

Inventor
Marvin Camras
By
Attys

Inventor
Marvin Camras

By The Firm of Charles W. Hills Attys

MAGNETIC RECORDING AND REPRODUCING APPARATUS

Filed Jan. 13, 1950

6 Sheets-Sheet 5

Inventor
Marvin Camras

By [signature] Attys

Jan. 3, 1956 M. CAMRAS 2,729,453

MAGNETIC RECORDING AND REPRODUCING APPARATUS

Filed Jan. 13, 1950 6 Sheets-Sheet 6

Inventor
Marvin Camras

By The Firm of Charles Hill
Attys

United States Patent Office 2,729,453

Patented Jan. 3, 1956

2,729,453

MAGNETIC RECORDING AND REPRODUCING APPARATUS

Marvin Camras, Chicago, Ill., assignor to Armour Research Foundation of Illinois Institute of Technology, Chicago, Ill., a corporation of Illinois Application January 13, 1950, Serial No. 138,476

19 Claims. (Cl. 274—4)

This invention relates to improvements in magnetic recording and reproducing apparatus and more particularly to such apparatus employing sheet record members.

A principal object of my invention is to provide a novel form of recording and reproducing apparatus utilizing a single sheet for the record member and obviating the necessity of playing back the entire record member when it is desired to listen to a part of the recording.

Another object of my invention is to provide a novel magnetic reproducing apparatus so arranged that various portions of the recording may arbitrarily be selected and reproduced irrespective of their location on the record member.

Still another object of my invention is to provide a new and novel form of magnetic recording and reproducing apparatus utilizing a single magnetizable material coated sheet of a convenient size for filing or mailing as the record medium.

A still further object of my invention is to provide a magnetic recording and reproducing apparatus having a novel form of sheet record aligning means, assuring alignment of the sheet record with respect to the path of travel of the transducer head when replacing in the apparatus so as to assure a clear and accurate reproduction.

Still another and further object of my invention is to provide a magnetic recorder having a rotatable drum carrying the sheet record medium together with a new and simplified form of means for wrapping the record medium around the drum in aligned relation with respect thereto and assuring that the record track thereon be in the proper aligned relation with respect to the transducer head for reproducing purposes.

Another and more detailed object of my invention is to provide a magnetic recording and reproducing apparatus including a power-driven drum and an electromagnetic transducer head movable therealong, together with a sheet wrapping means encircling the drum and having an inner sheet engaging face of a lower coefficient of friction than the coefficient of friction of the face of the drum, with edges diverging from a central point adjacent the transverse center of the drum at opposite helix angles to evenly spread the sheet along and wrap it around the drum in aligned relation with respect thereto and with respect to the path of travel of the transducer head.

A further and more detailed object of my invention is to provide a magnetic recording and reproducing apparatus utilizing a sheet for the recording medium and having a drum around which the sheet is wrapped during recording and reproducing, together with a novel form of sheet aligning and wrapping means movable into engagement with the outer side of the sheet during rotation of the drum, and uniformly spreading the sheet across the face of the drum and aligning it with respect thereto.

A still further object of my invention is to provide a novel form of magnetic record member consisting of a flat sheet with helical recording lines extending therealong from one side to the other for a portion of the length thereof.

Another and important object of my invention is to provide a new and improved form of recording apparatus so arranged that more than one record may be made at a time.

These and other objects of my invention will appear from time to time as the following specification proceeds and with reference to the accompanying drawings wherein.

Figure 18:
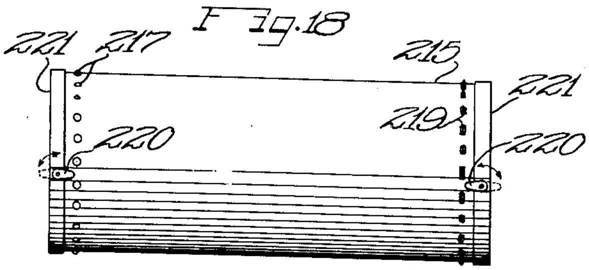
Figure 18 is a plan view showing a modified form of record carrying drum which may be used to carry the sheet record for recording and reproducing purposes.
Figure 20:
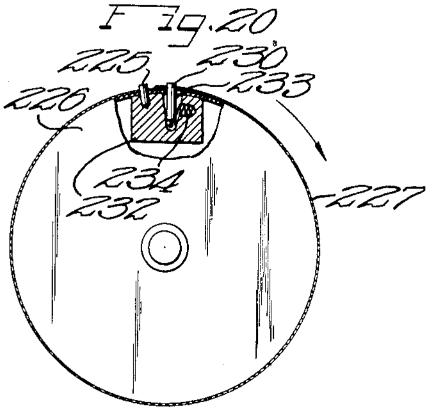
Figure 19:
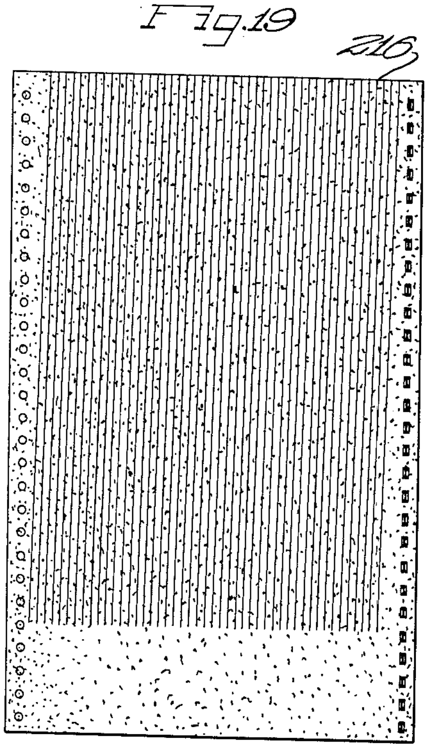
Figures 21, 22:
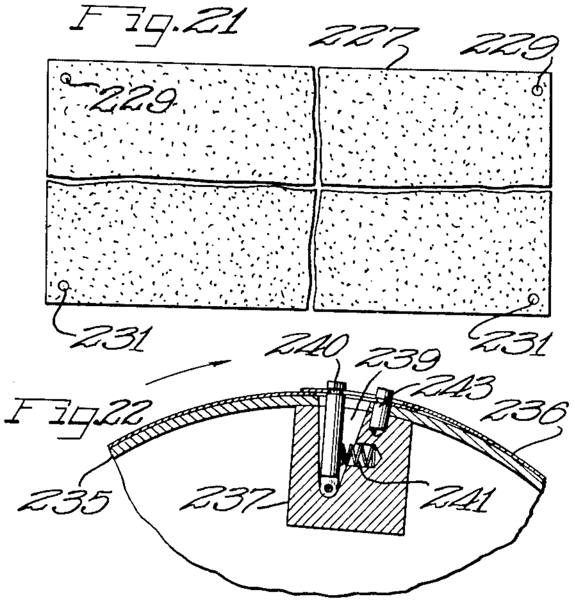
Figure 23:
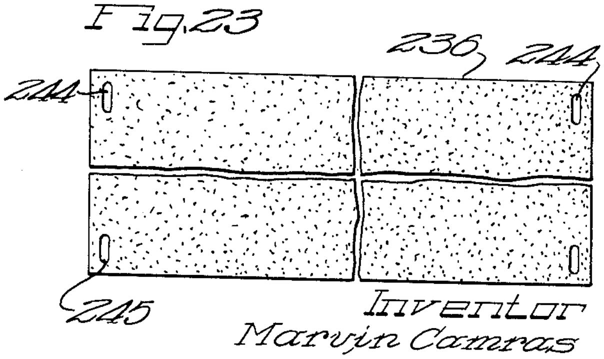

Figue 19 is a plan view showing a sheet record of a type which may be carried on the drum shown in Figure 18;

Figure 20 is an end view of a record carrying drum with parts thereof broken away and shown in transverse section in order to illustrate another form of means for holding the sheet record on its drum in aligned relation with respect thereto;

Figure 21 is a fragmentary view of a sheet record of a type which may be carried on the drum shown in Figure 20;

Figure 22 is an enlarged fragmentary transverse sectional view taken through another form of record carrying drum constructed in accordance with my invention and showing still another way in which the record sheet may be held on its record carrying drum in aligned relation with respect thereto; and Figure 23 is a fragmentary plan view of a type of sheet record which may be carried on the drum shown in Figure 22.

The magnetic recording and reproducing apparatus shown in the drawings, and for the purposes of simplicity hereinafter designated by the term "magnetic recorder," includes a housing 10 which may house the amplifier and oscillator of the recorder and the drive means for the record sheet. As herein shown, a motor 11 is mounted in a side wall of said housing and drives a speed reducer 12 which forms a means for driving a cylinder or drum 15 adapted to have a record sheet 16 wrapped thereatound for recording and reproducing purposes. The record sheets may be of a convenient size, such as letter size, and may be thin enough that two or more sheets may be wrapped on the drum 15 to make multiple recordings when desired. The speed reducer 12 may be any well known form, arranged to reduce the speed of the motor 11 and drive the cylinder or drum 15 at the correct speed for recording and reproduction purposes. Said speed reducer is no part of my present invention, so need not herein be shown or described in detail. The housing 10 is covered at its top by a base 17 for the recording mechanism and is herein shown as having a down-turned periphery 18 having a lower outwardly facing shouldered portion engaging the tops and insides of the side walls of the housing 10 and detachably supporting said base thereon.

An electromagnetic recording and reproducing head 19 for making a magnetic record, reproducing a magnetic record, or for erasing the recod, or for doing all three of these operations, is mounted to rest on the record sheet 16 on the drum 15. This head will hereinafter be termed an "electromagnetic transducer head" or a "transducer head" in order to simplify the description. The electromagnetic transducer head 19 may be of several well known forms and is no part of my present invention, so need not herein be shown or described in detail.

The drum 15 is herein shown as being a hollow drum closed at its ends and having a resilient outer periphery or sheet engaging face 21 embedded therein which may be of rubber, cork, or some other like material having a relatively high coefficient of friction to grip and feed the sheet record medium. The resilient face 21 is herein shown as being recessed within the periphery of the drum a slight distance beneath end closure walls 22—22 thereof, the inner edges of which end closure walls may form side flanges for the drum 15.

Figures 1, 2:
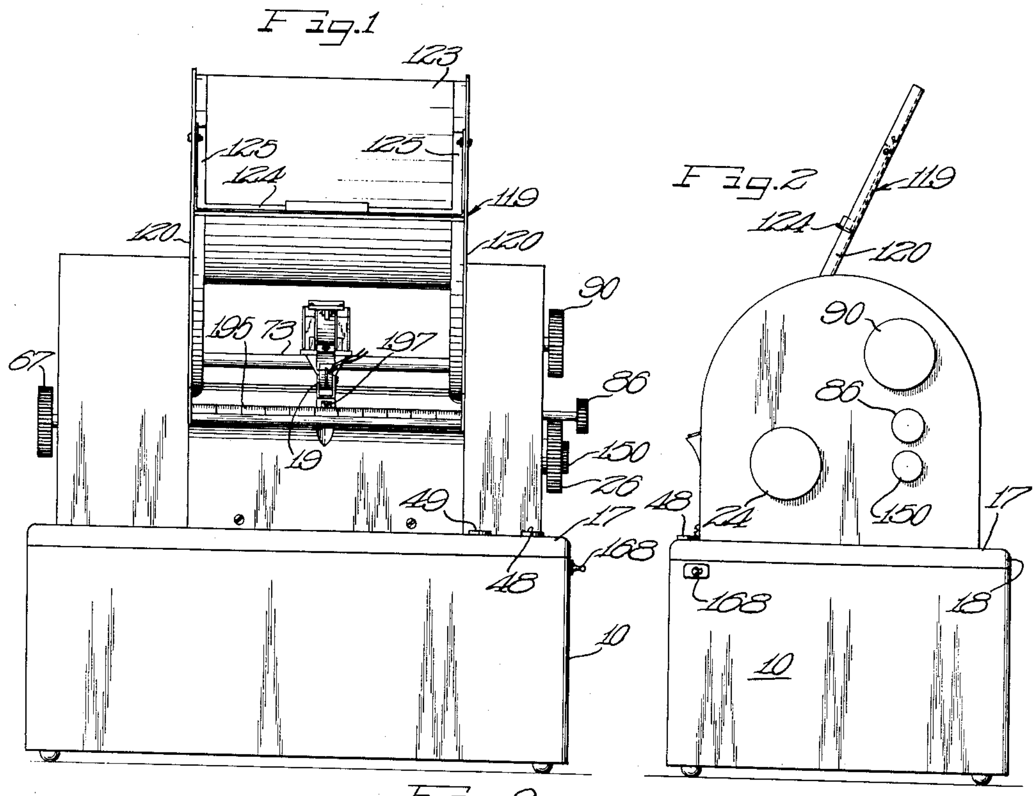
Figure 1 is a view in front elevation of a recording and reproducing apparatus constructed in accordance with my invention.
Figure 2 is a view in side elevation of the apparatus shown in Figure 1.
Figures 9, 10:
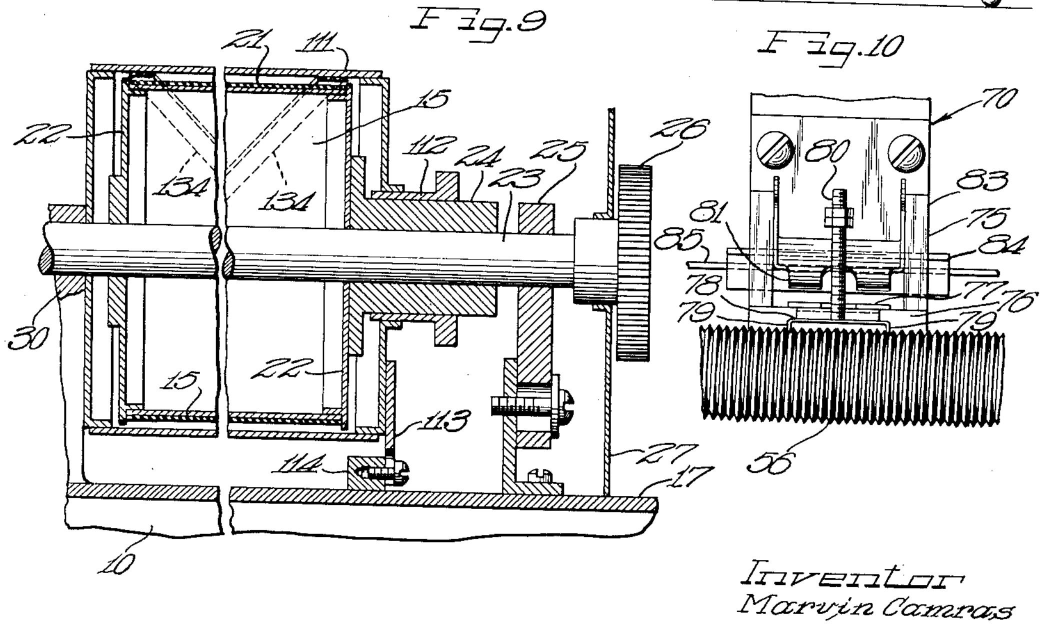
Figure 9 is an enlarged partial fragmentary transverse sectional view taken through the drive drum for the sheet record medium and the wrapping means therefor in order to show certain details of construction thereof.
Figure 10 is an enlarged detail fragmentary front view of the lead screw and the feed means for the transducer head.

The drum 15 is shown in Figure 9 as being mounted on a longitudinal drive shaft 23 on its end closure walls 22—22 and as having a hub 24 extending from the right-hand wall thereof. The drive shaft 23 is journalled adjacent its right-hand end on a bearing bracket 25 secured to and projecting upwardly from the base 17. A knurled or toothed knob 26 is shown as being secured to the right-hand end of the shaft 23 for turning said shaft and the drum 15 by hand. The knob 26 is herein shown as being rotatably mounted in a flanged recess of an end wall 27 of a casing for certain of the operative parts of the magnetic recorder. The shaft 23 is journalled adjacent the opposite end of the drum 15 on an upright bearing support member 30 secured to and projecting upwardly from the base 17. The shaft 23 is herein shown as projecting outwardly beyond said bearing support member and as having a pulley 31 freely mounted on its outer end and driven from the speed reducer 12 at a predetermined speed of rotation through an endless belt 32, herein shown as being a flat belt.

The pulley 31 has a hub 33 provided with a plurality of jaws 34—34 formed on its inner face and adapted to be engaged by corresponding jaws 35—35 formed on the inner face of a clutch collar 36 feathered on the shaft 23 for driving said shaft. The clutch collar 36 is herein shown as having a groove 37 extending around its periphery and slidably engaged by a clutch fork 39 pivotally mounted in and extending upwardly from an upright support member 40*a*. The shaft of the fork 39 extends downwardly beneath the bottom of the base 17 and has a lever arm 40 secured to its lower end. The clutch fork 39 is rocked to shift the clutch collar 36 by a link 41 pivotally connected between the lever arm 40 and a lever arm 45 pivotally mounted for movement about an axis extending transversely of the housing 10. The lever arm 45 is pivotally mounted on a horizontally extending arm 46 of a depending bracket 47. Push-buttons 48 and 49 are slidably mounted in the base 17 for depressible movement with respect thereto and are connected to opposite ends of a lever arm 50 pivotally mounted intermediate its ends on the arm 46 of the bracket 47 and operatively connected with the lever arm 45 to pivot said lever arm and engage the clutch upon depression of the push-button 48 and disengaging the clutch upon depression of the push-button 49 in an obvious manner.

A spur gear 53 is herein shown as being secured to the shaft 23 between the bearing support 30 and the clutch collar 36 and serves as a drive means for feeding the transducer head 19 translationally along the face of the drum 15. The spur gear 53 meshes with spur gear 54 secured to a longitudinal shaft 55 spaced rearwardly of the shaft 23 and the drum 15 and herein shown as being threaded intermediate its ends and forming a lead screw 56 for feeding the transducer head 19 along the face of the drum 15. The shaft 55 is herein shown as being rotatably mounted adjacent its opposite ends on parallel spaced side plates 59 and 60 extending upwardly from opposite sides of the base 17. As herein shown, the right-hand end of the shaft 55 is drilled and is rotatably mounted on a pin 61 extending inwardly from the side plate 60. A spring 62 is mounted within the drilled portion of said shaft and is interposed between the end of the pin 61 and the base of the drilled portion of said shaft and urges the opposite end of said shaft 55 into engagement with a pintle bearing 63 engaging a recessed portion 64 of said shaft. The pintle bearing 63 is formed on the inner end of a pin 65 threaded in the side plate 60 and projecting outwardly therefrom through a side wall 66 of the casing for the drive mechanism for the shafts 23 and 55. A knob 67 having a toothed periphery is herein shown as being secured to the outer end of the pin 65 for adjustably moving the lead screw 56 along its axis against the spring 62 or for allowing said spring to move said lead screw toward said knob. This is to give a fine adjustment to the transducer head 19 to exactly track the head with the record track on the sheet record when necessary.

The transducer head 19 is adjustably mounted on the forward end of a rack bar 69 for movement into position to lie over and slidably engage the magnetizable surface of the record sheet 16. The rack bar 69 is carried on the carriage 70 and is slidably guided thereon for movement transversely of the drum 15 and for vertical movement with respect thereto along the upper sides of parallel spaced side walls 71—71 thereof on opposite ends of a pin 72 extending transversely through said bar and slidably engaging the top surfaces of said side walls.

The carriage 70 is slidably supported for movement in the direction of the axis of the drum 15 on two spaced transverse rods 73 and 74 mounted at their ends in the side plates 59 and 60. The rod 73 is disposed above the drum 15 inwardly of the center thereof but forwardly of the lead screw 56. The rod 74 is shown as being spaced rearwardly of the lead screw 56 and as slidably extending through a depending leg 75 of the carriage 70.

The leg 75 forms a mounting for the feed means for the carriage 70 and transducer head 19 on a shelf 76 projecting inwardly from the lower end of said leg. A support member 77 is herein shown as being secured to the top of the shelf 76 and as projecting therefrom in vertically spaced relation with respect to the lead screw 56. A leaf spring 78 is secured to the bottom of the support member 77 and extends therealong in the same general direction as said support member in vertically spaced relation with respect thereto. The leaf spring 78 may have downwardly turned outer sides 79—79, the lower margins of which are recessed to conform to the radius of curvature of the lead screw 56, at the root thereof, for engagement with the threads of said lead screw to effect feeding movement of the carriage 70 along the parallel rods 73 and 74 upon rotation of said screw.

While the leaf spring 78 is herein shown as having parallel spaced downwardly turned outer sides engageable with the threads of the lead screw 56, and thus forming the feed nut of the carriage 70, said spring need not be so constructed but may have a separate half feed nut or feed elements secured thereto for engagement with the lead screw 56.

The feed nut formed by the downwardly turned sides 79—79 of the leaf spring 78 is disengaged from the lead screw 56 by a threaded rod 80, herein shown as being suitably secured to said leaf spring, and projecting upwardly therefrom through a slotted outer end portion of the support member 77. The threaded rod 80 extends upwardly through the outer end portion of a pivoted arm 81, pivotally mounted at its inner end between opposite parallel spaced sides of a bracket member 83 secured to the forward side of the leg 75 and resting on the shelf 76. A cam member 84 is pivotally mounted between the parallel spaced sides of the bracket member 83 and is herein shown as being of circular form having a flattened surface. The cam member 84 is slotted in the direction of its pivotal axis to slidably receive a rectangular operating bar 85 extending therethrough. The outer end portion of the bar 85 is of a cylindrical formation, is pivotally mounted in the side plate 60 and extends through the side plate 59 and side wall 27 and has a knob 86 secured to its outer end.

Thus, when the flattened portion of the cam member 84 is in engagement with the arm 81, the feed nut will be in engagement with the threads of the lead screw 56. Upon turning of the knob 86 and bar 85, the arm 81 will ride on the high portion of the cam member 84 to raise the feed nut away from the lead screw 56 and stop feeding movement of the carriage 70.

Movement of the rack bar 69 and transducer head 19 toward and from the drum 15 is effected by an elongated pinion 87 formed by a rod having teeth cut therealong for a portion of the length thereof. The pinion 87 meshes with the downwardly facing teeth of the rack bar 69. The pinion 87 extends through and is rotatably and slidably mounted in spaced upright brackets 88—88 of the carriage 70. The outer end of said pinion is rotatably supported in the side plate 59 and extends outwardly therefrom and through the side wall 27 of the casing. A knob 90 is provided to turn said pinion and effect translational movement of the rack bar 69 and extensibly or retractibly move the transducer head 19.

The rack bar 69 is slidably guided adjacent its rear end in an upright slot 91 formed in an upwardly projecting rear end portion 92 of the carriage 70. Said rack bar is also slidably guided between two parallel spaced blocks 94—94 spaced forwardly of the slot 91 and secured to and extending upwardly from a bottom plate 95 of the carriage 70. A pin 69*a* extends transversely through the rear end portion of the rack bar 69 and rides upwardly along a cam surface 69*b* to depress the forward end of said rack bar and limit extensible travel thereof. A roller 96 rotatably mounted on the free end of the leaf spring member 97 yieldably engages the top of the rack bar 69 and retains the teeth thereof in mesh with the teeth of the pinion 87 and also holds the pin 72 in engagement with the tops of the side walls 71—71. A leaf spring member 99 secured to the tops of the blocks 94—94 extends inwardly therefrom and overlaps and engages the top surface of the leaf spring member 97. The leaf spring member 97 is herein shown as being secured at its rear end to the upper end of the upright support member 92 and as projecting forwardly therefrom and positioning the roller 96 beyond the center of the pinion 87 on the side thereof adjacent the drum 15 to exert a force on the rack 69 in a direction to depress the transducer head 19 and hold the teeth of the rack bar 69 in mesh with the pinion 87 and also to cause said transducer head to follow the contour of the tops of the side walls 71—71 to elevate or lower the head 19.

The transducer head 19 is adjustably mounted on the forward end of the rack bar 69 on the depending lower end portion of a bracket member 100 by means of a spacer link 101. The spacer link 101 is suitably connected at its rear end to the depending end of the bracket member 100 as by a machine screw 103. The forward end of the spacer link 101 extends between the furcations of a bifurcated rear end portion 104 of the transducer head 19 and is suitably secured thereto as by a machine screw 105. The transducer head 19 may thus be adjusted in the proper relation with respect to the periphery of the drum 15 to cause its pole pieces to conform to the periphery of said drum and have slidable engagement therewith, and when once adjusted may be held in position by tightening the machine screws 103 and 105.

The spacer link 101 has a tongue 106 extending rearwardly therefrom which slidably fits between two spaced depending fingers 107—107 depending from the forward end of the carriage 70 to prevent side play of the transducer head 19.

The means for wrapping the sheet record 16 and spreading it across the drum 15 and aligning it with respect thereto, to assure that said sheet record will always be in the same relative position with respect to the transducer head 19 for reproduction purposes as well as for recording purposes and thus to assure an accurate reproduction free from side interference, includes a wrapping cylinder or casing 111 encircling the drum 15. The casing 111 is herein shown as being closed at its ends and as being uniformly spaced from the periphery of said drum. Said casing is mounted at its right-hand end on a bearing member 112 encircling the hub 24 (Figure 9) and is supported on a depending leg 113 secured to the end wall thereof and adjustably secured to a transverse bar 114 extending across the base 17. The opposite end wall of the cylindrical casing 111 is shown as being secured to the upright bearing support 30.

The casing 111 has a slot 117 extending therealong adjacent its upper forward portion to receive the transducer head 19 and also to receive the record sheet 16. Said record sheet is guided to pass into said slot along an upright rearwardly inclined sheet aligning guide 119. The guide 119 consists of two longitudinally spaced angles 120—120 inclined upwardly and rearwardly from the receiving end of the slot 117. The angles 120—120 are supported on the rod 73 on opposite sides of the transducer head 19. The angles 120—120 are connected together adjacent their upper ends by a plate 123 upon which the record sheet is slidably held in position by a pivoted retaining bar 124. The retaining bar 124 is secured to the lower ends of spaced arms 125—125 pivotally connected to the upright sides of the angles 120—120 and may have a felt, plush or like engaging surface offering the desired amount of friction against the sheet and allowing the sheet to be fed downwardly therealong under a slight tension as it is wrapped around the drum 15. The guide 119 is of substantially the same width as the record sheet and there is very little clearance between the sheet and the edges thereof to afford an accurate aligning guide for the sheet as it slides downwardly to the drum 15.

A means is provided to initially start the record sheet 16 to wrap around the drum 15 and to assure alignment of the sheet with opposite edges of the drum, and, where there is already a recording on the sheet, to assure that the record track be properly aligned with the transducer head 19 for reproducing purposes. This wrapping means includes a pivoted sheet engaging shoe 129. The shoe 129 closes a rectangular opening 130 in the transverse central portion of the casing 111 just beneath the slot 117 and is pivotally connected to the outer wall of said casing with its center in alignment with the center of the drum 15 on a longitudinally extending pivotal pin 131. The shoe 129 is herein shown as having a sheet engaging member 132 secured to its inner side and extending inwardly of the inner periphery of the casing 111 into engagement with the magnetizable record sheet when the shoe 129 is closed. The sheet engaging member 132 may be of a soft material offering frictional resistance against the record sheet sufficient to spread the sheet laterally along the drum 15 and wrap it around and center it with respect to said drum but of a lesser coefficient of friction than the coefficient of friction of the yieldable surface of the drum. The sheet engaging member 132 is herein shown as being made from plush, but the member need not be made from plush and may be felt, velvet, or various other like forms of cloth or any other suitable material having a coefficient of friction less than that of the outer surface of the drum 15 and may even be made from wood or metal. The sheet engaging member 132 is herein shown as being substantially in the form of a truncated triangle having opposite sides thereof extending at opposite helix angles diverging from a central point with respect to the drum 15. When the drum 15 initially starts to rotate, the shoe 129 is pivoted from the open position out of engagement with said drum and the sheet thereon shown in Figure 7 to the closed position shown in Figure 3, engaging the sheet engaging member 132 with the outer surface of the sheet and spreading the sheet laterally and initially wrapping the sheet around the drum 15. The sheet engaging member 132 having its opposite edges cut at opposite helix angles diverging from an initial starting point at the center of the drum and at the entering end of the shoe 129, besides wrapping the sheet around the drum, exerts a lateral spreading force acting from the center thereof in opposite directions to assure uniform engagement and alignment of the record sheet 16 around the periphery of the drum 15.

Engaging strips 133—133, which may also be made of plush, have outer edges forming continuations of opposite edges of the sheet engaging member 132 on the shoe 129 and are herein shown as extending to the outer edges of said shoe. Similar plush strips 134 extend spirally within the inner wall of the casing 111 from the strips 133—133 around and outwardly of the casing 111 and may terminate adjacent the end walls thereof adjacent the upper end of the slot 117. These last-mentioned strips are of sufficient thickness to continually engage the outside of the magnetizable record sheet, holding it to the outer surface of the drum and wrapping it therearound and spreading it laterally from the center to the outside of the drum to align and hold the sheet in alignment on the drum 15 during the recording and reproducing operations.

The means for moving the shoe 129 and the sheet engaging member 132 into engagement with the magnetizable record sheet 16 on the drum 15 and yieldably engaging said engaging member with the sheet includes an arm 135 secured to the outside of the shoe 129 as by welding. The arm 135 extends downwardly from the shoe 129 in spaced relation with respect to the casing 111 (Figure 3) and rearwardly beneath said casing beyond the rear end thereof. The free end of the arm 135 is engaged by the free or forward end of a leaf spring 136 to urge said arm in a direction to move the shoe 129 into a closed position and engage the engaging member 132 with the sheet record 16. The leaf spring 136 is herein shown as being of an arched formation secured at its end opposite the arm 135 to the base of an angle bracket 139 by a machine screw 140. A link 141, herein shown as being of an inverted U-shaped formation, extends along opposite sides of the arm 135 just ahead of the spring 136 and is pivotally connected to said arm by a pivotal pin 142. The cross member connecting the upper ends of the legs of the link 141 together has an adjusting screw 143 threaded therein. The lower end of the adjusting screw 143 is shown as being pointed and as having engagement with a corresponding recess formed in a horizontal leg 142*a* of a bar 144 extending longitudinally from a rocking member 145. The leg 142*a* extends between the link 141 for engagement with the pointed end of the screw 143. The rocking member 145 extends downwardly along the opposite sides of the support member 146 and is pivotally connected thereto by pintle bearings formed by the conical ends of screws 147—147. The screws 147—147 are threaded in opposite sides of the rocking member 145 and engage corresponding conical recessed portions formed in opposite sides of the support member 146.

Figure 3:
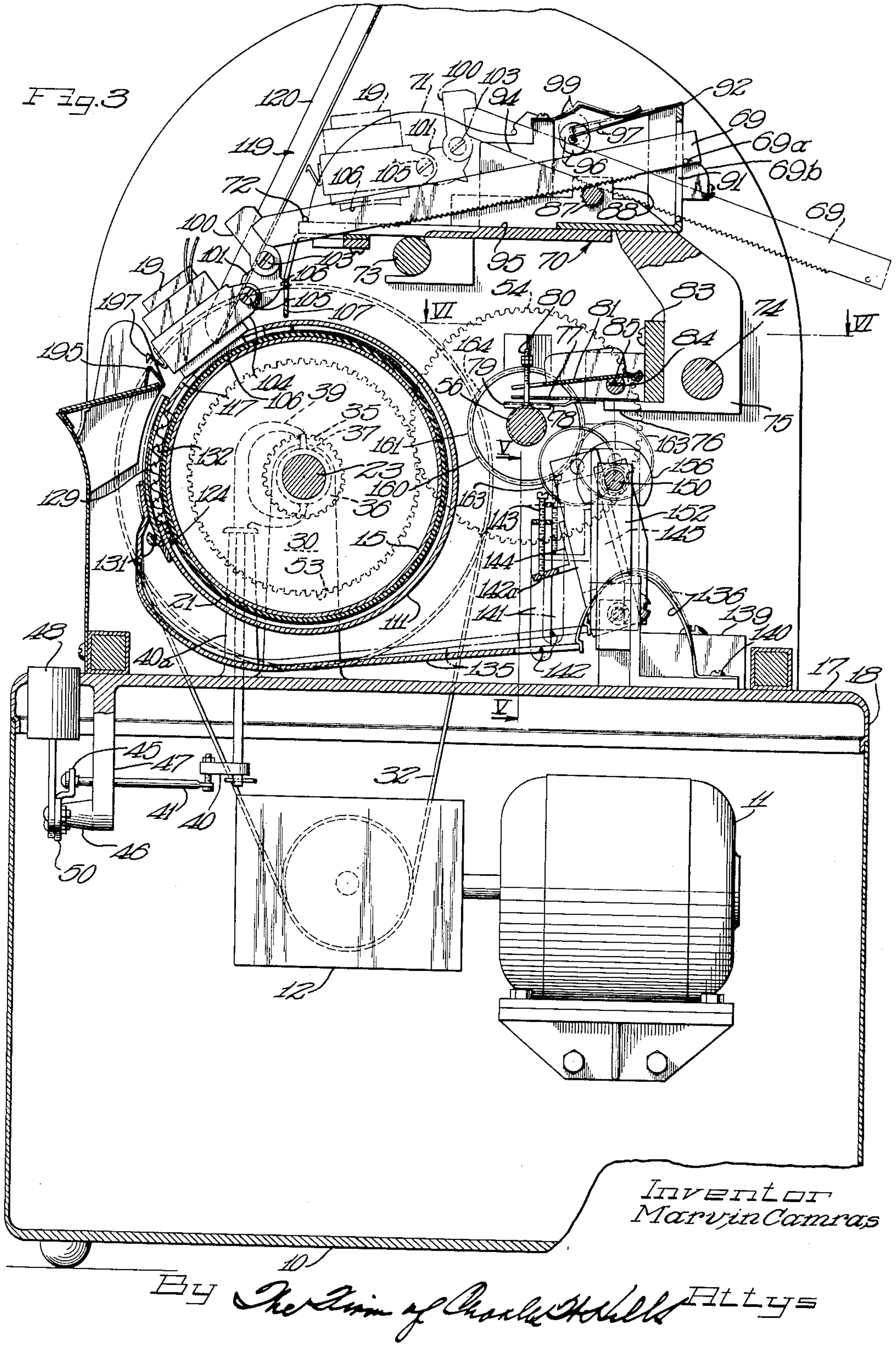
Figure 3 is a fragmentary view in side elevation of the apparatus shown in Figure 1 with certain parts thereof broken away and certain other parts shown in transverse section.

It may be seen with reference to Figure 3 that rocking movement of the rocking member 145 in a clockwise direction from the position shown in solid lines in Figure 3 to the position shown by broken lines in this figure will elevate the link 141 and pivot the arm 135 and the shoe 129 in a counter-clockwise direction out of engagement with the face of the drum 15.

A plunger 150, slidably mounted in spaced supports 151 and 152 projecting upwardly from the bracket member 139, is provided to pivot the rocking member 145 in a direction to move the shoe 129 into an open or disengaged position. The plunger 150 is encircled for a portion of its length by a compression spring 154. Said compression spring is interposed between the support 151 and a guide member 155 secured to said plunger and depending therefrom and urges the plunger 150 to a released position. The lower end of the guide member 155 is of a forked formation and extends along opposite sides of the angle bracket 139, slidably engaging the vertical leg thereof to prevent turning movement of the plunger with respect thereto.

An engaging disk 156 is herein shown as being mounted on the inner end of the plunger 150 for abutting engagement with the inner end of a rod 157 slidably mounted adjacent the upper end of the rocking member 145. The disk 156 is of sufficient diameter to engage the inner end of the rod 157 in all positions of the rocking member 145 with respect thereto. A conical cam 159 is secured to the opposite end of the rod 157 from the disk 156 for engagement with a beveled end 160 of a hub 161 of the gear 54. When the rocking member 145 is in the forwardly pivoted position shown in Figure 3 and the shoe 129 is in a closed position, pushing of the plunger 150 inwardly by the hand will cause the conical surface of the cam 159 to ride outwardly along the beveled surface 160 of the hub 161. This will pivot the rocking member 145 in a clockwise direction to elevate the link 141 and open the shoe 129 and move the sheet engaging member 132 out of engagement with the face of the drum 15 and the sheet thereon.

The conical cam 159 has a ridge 163 formed at its base which is engageable with a corresponding annular recess 164 extending along the hub of the spur gear 54. This ridge serves to lock the conical cam 159 to the hub 161 for rotation therewith and to hold the rocking member 145 in an upright position and lock the shoe 129 in open position until released.

Figure 4:
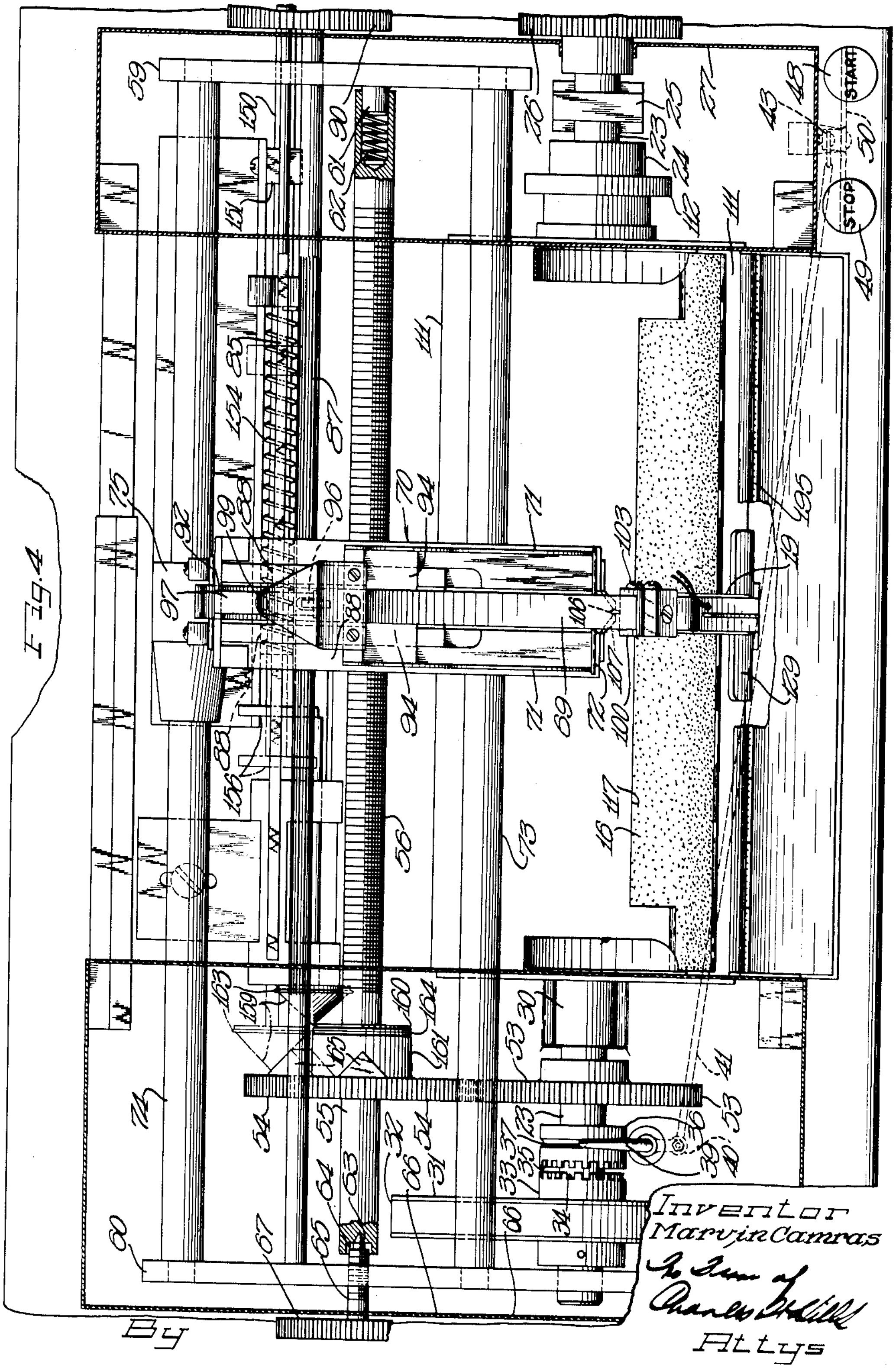
Figure 4 is an enlarged fragmentary plan view of the apparatus shown in Figure 1 with certain parts thereof broken away and certain other parts shown in horizontal section.
Figure 5:
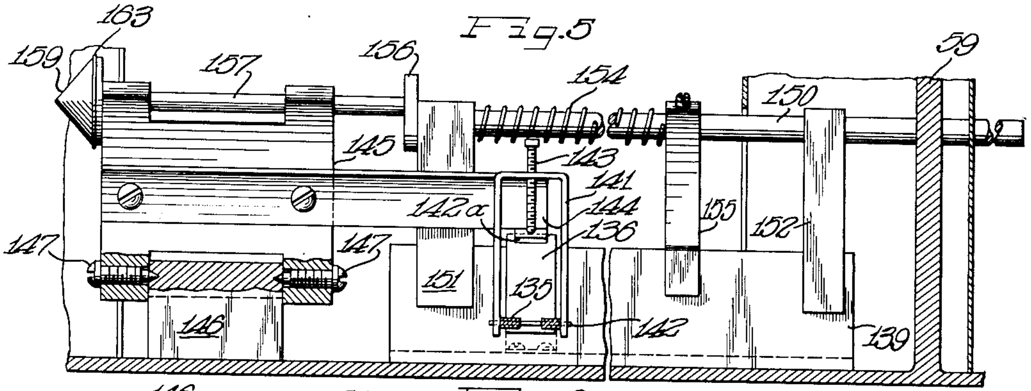
Figure 5 is an enlarged fragmentary longitudinal sectional view taken substantially along line V—V of Figure 3.
Figure 6:
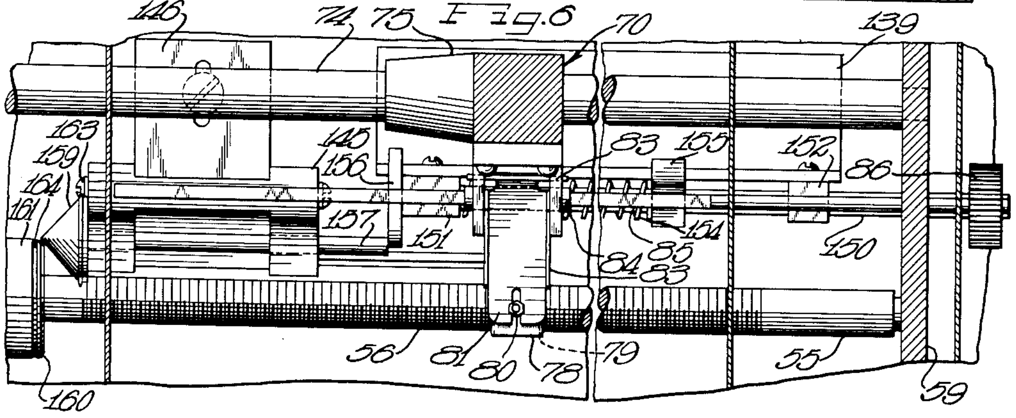
Figure 6 is an enlarged fragmentary horizontal sectional view taken substantially along line VI—VI of Figure 3.

A releasing cam 165 extends inwardly from the inner side of the spur gear 54 to engage the cam 159 and release said cam from the recess 164 and then move said cam 159 inwardly out of engagement with the beveled end 160 of the hub 161 and allow the leaf spring 154 to close the sheet engaging shoe 129 (Figure 4). The releasing cam 165 is shown in Figure 4 as being of a V-shaped formation with its peak facing the cam 159 and with its sides formed at the angle of slope of the cam 159.

Figure 16:
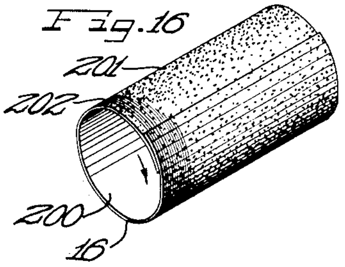
Figure 16 is a modified isometric view, showing the record sheet in the position it will assume when wrapped around the drum.

When starting the operation of wrapping the magnetizable record sheet around the drum 15 for recording or reproducing purposes, the electromagnetic transducer head 19 is elevated along the side plates 71—71 by the pinion 87 and rack bar 69 to the position shown by broken lines in Figure 3 rearwardly of the guide 119. The feed nut formed by the downturned sides 79—79 of the leaf spring 78 may at the same time be released from the lead screw 56 by turning movement of the operating bar 85 through the knob 86. The record sheet 16 being placed in the guide 119 and slidably held to the plate 123 by the retaining bar 124 may be trained by hand to the position shown in Figure 7 against the friction exerted by the bar 124. In this position the plunger 150 has been depressed and the rocking member 145 is held in an upright position by the ridge 163 engaging the recess 164. The motor 11 may then be started and the clutch may be engaged to effect rotation of the drum 15 by depression of the start button 48. This will also rotate the spur gear 54 and cam 165, bringing said cam into engagement with the conical face of the cam 159 and moving said cam out of engagement with the recess 164 to release the rocking member 145 to pivot to an inwardly inclined position effected by the leaf spring 136. This spring will at the same time move the arm 135 in a forward direction and close the shoe 129 and engage the material engaging member 132 thereon with the leading end of the record sheet. The material engaging member 132 having its opposite sides formed at opposite helix angles diverging from a point in alignment with the center of the drum 15 will start the record sheet to wrap around the drum 15 and at the same time align the strip by spreading it laterally from its center as it is wrapped therearound. Continued rotation of this drum 15 will feed the sheet downwardly along the guide 119 under tension exerted by the retaining bar 124 in exact alignment with the sides of the drum due to the tendency of the sheet engaging member 132 and the strips 133—134 and 134—134 to urge the record sheet to spread sideways in opposite direction from its center while placing lateral tension on the sheet acting in opposite directions from the center thereof. Furthermore, engagement of the sheet by the engaging member 132 and the strips 133—133 and 134—134 will maintain the sheet in tight engagement with the drum 15 with its trailing end overlapping its leading end during the recording or reproducing operations and forming the magnetizable record sheet into a cylindrical record member for recording or reproduction purposes as shown in Figure 16, taking up very little filing space and capable of being folded and mailed.

Figures 7, 8, 11, 12:
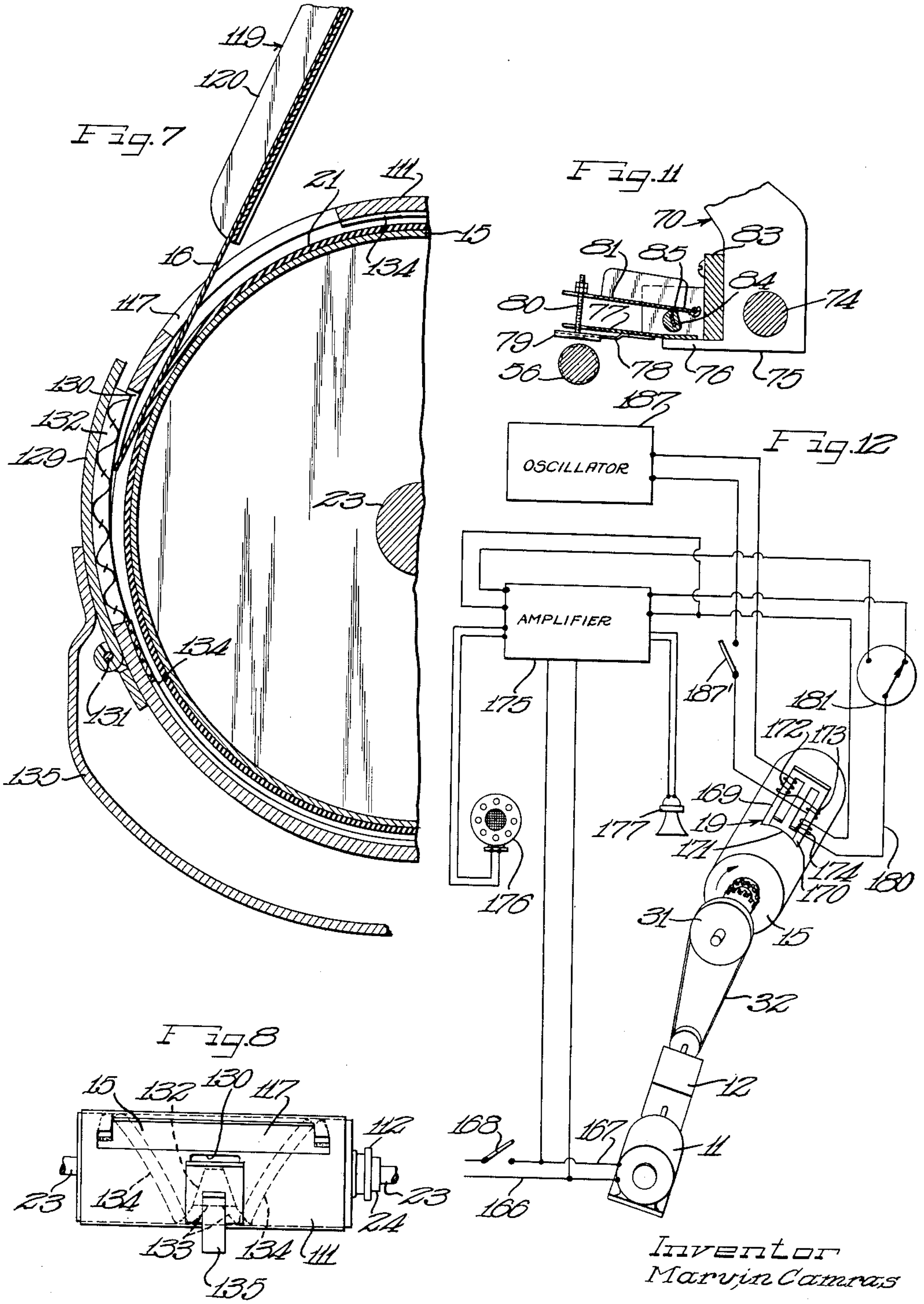
Figure 7 is an enlarged fragmentary transverse sectional view showing certain details of the record wrapping and aligning means.
Figure 8 is a fragmentary front end view drawn to a reduced scale and showing certain other details of the sheet record wrapping and aligning means not shown in Figure 7.
Figure 11 is an enlarged fragmentary transverse sectional view taken through the lead screw and feed means for the transducer head showing the feed means in a disengaged position.
Figure 12 is a wiring diagram showing the electrical elements of the recording and reproducing apparatus and the wiring connections thereto.

In Figure 12 of the drawings I have diagrammatically illustrated the electrical circuit for the apparatus. The motor 11 is connected with a source of power supply, which may be a 110-volt lighting circuit, by means of conductors 166 and 167 through a starting switch 168 in the conductor 167 which when closed supplies power to the entire apparatus. The switch 168 may be mounted in a side wall of the casing 10. The conductors 166 and 167 are likewise connected with an audio-amplifier and equalizer 175.

The transducer head 19 includes a core of high magnetic permeability but low retentivity and includes a pair of legs 169 and 170 having outer ends conforming to the curvature of the drum 15 as well as a central T-shaped leg 171 disposed to form a pair of non-magnetic gaps between the confronting pole portions of said outer legs. A high frequency alternating current erase coil 172 is wound on the leg 169. This erase coil is connected in series with a high frequency bias coil 173 wound on the leg 170 to a high frequency oscillator 187 through a switch 187'. A signal coil 174 is also wound on the leg 170 and is arranged to be connected selectively to either the input or output of the amplifier 175 through a two-way switch 181, as will be apparent to those skilled in the art.

The amplifier 175 has a microphone 176 connected thereto for recording purposes and also has a speaker 177 connected thereto for play-back or reproduction purposes.

When the coil 174 is energized with a signal to be magnetically recorded on the record sheet 16, a fluctuating magnetic field is set up in the gap between the confronting portions of the legs 170 and 171. As a part of the recording operation, the coils 172 and 173 are also energized from the oscillator 187 simultaneously with energization of the signal coil 174. Energization of the coil 172 causes a fluctuating magnetic field to be set up in the gap between the confronting portions of the legs 169 and 171. By way of example, and not by way of limitation, this gap between the confronting portions of the legs 169 and 171 may be on the order of .010 inch as compared with a gap between the confronting portions of the legs 170 and 171 on the order of .001 inch. The fluctuating magnetic field set up by the erase coil 172 causes demagnetization of the magnetizable record medium immediately prior to its passing over the gap in which the fluctuating signal is set up. The energization of the high frequency bias coil 173 simultaneously with the energization of the signal coil 174 causes improved recording for the reasons and in the manner set forth in my issued Patent No. 2,351,004 entitled "Method and Means of Magnetic Recording," granted June 13, 1944.

An indexing plate 195 extends across the front of the wrapping cylinder 111 adjacent the lower end of the slot 117 and just beneath the transducer head 19 for the convenience of the operator of the apparatus. An indexing pointer 197 extends forwardly from the forward end of the transducer head to a position adjacent the indexing plate 195 to inform the operator of the apparatus of the exact relative position of each portion of the recording at all times during operation of the apparatus.

Figure 13:
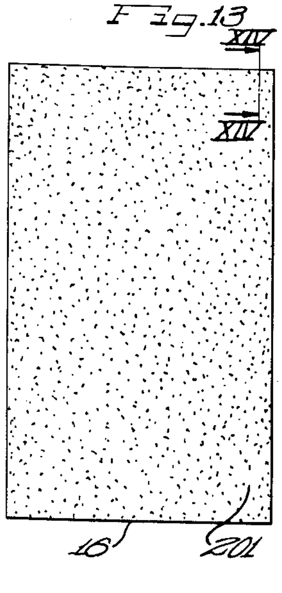
Figure 13 is a plan view of a record sheet having a magnetizable material coated thereon.
Figure 15:
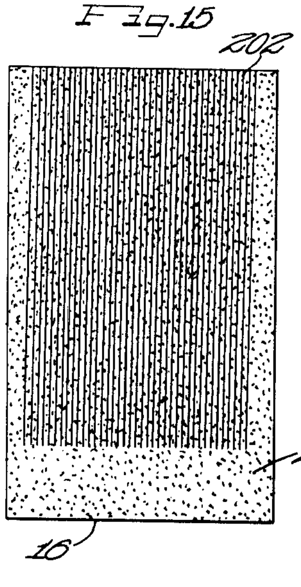
Figure 15 is a plan view of the sheet shown in Figure 13 upon which a recording has been made and diagrammatically illustrating the spiral record track thereon.
Figure 14:
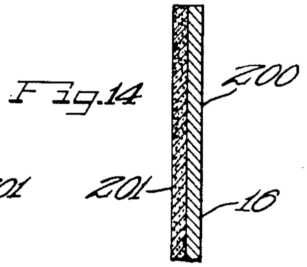
Figure 14 is a fragmentary sectional view taken substantially along line XIV—XIV of Figure 13.

The sheet record member 16 shown in Figures 13 and 14 has a principal body portion 200 which may be made of paper or any other like material and which may readily be wrapped around the drum 15 and also may be folded and mailed without injuring the record. The body portion 200 is shown as being coated on one of its sides with a ferro-magnetic material 201 which may be a suitable form of magnetic iron oxide. The method of coating the sheet and retaining the coating thereon is no part of my present invention, so is not herein shown or described. Figure 15 diagrammatically indicates a spiral record track 202 on the sheet as it would appear when the sheet is unwrapped from the drum 15 after the recording operation, showing a margin at the overlapped end of the sheet and showing the record track going to the extreme end of the overlapping end of the sheet. In Figure 16 is shown the cylindrical form the record member assumes when wrapped on the drum 15, showing the trailing end thereof overlapping the leading end thereof and showing the continuous spiral the record track assumes when the sheet is in a cylindrical form on its drum. The sheet record member 16 may be of any size, but preferably may be of a size which may readily be folded and placed in an envelope for mailing.

Figure 17:
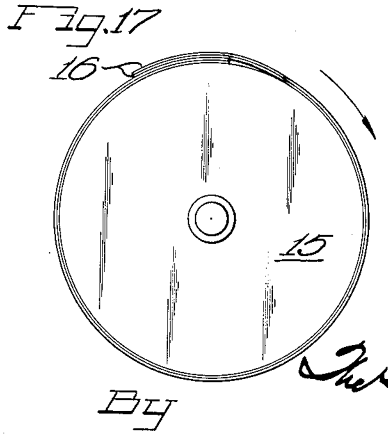
Figure 17 is an end view of a record carrying drum showing two record sheets wrapped thereon for making duplicate recordings.

In Figure 17 two sheet records 16—16 are shown as being wrapped on the drum 15 for making duplicate recordings. When placing two or more sheet records on the drum 15, the sheets may be aligned one on top of the other in the guide 119 and may then be wrapped around the drum 15 in the same manner a single sheet is wrapped around and aligned with respect to said drum. After wrapping the sheets around the drum, one on top of the other, recording may be proceeded with, rendering a duplicate recording with no more effort or mechanism than is required to make a single recording.

While I have herein shown two sheet records on the drum 17, it is obvious that the number of sheets on said drum may be increased to simultaneously make more than one simultaneous recording. In order, however, to make multiple recordings, each of which has a clear record fidelity, it is preferable that the sheet records be thinner than for a single recording, and the more recordings the thinner the sheets should be.

In Figure 18 I have shown a record carrying drum 215 adapted to have a sheet record 216 wrapped therearound. The drum 215 is much like the drum 15 and may be mounted on the base 17 and driven from the motor 11 in the same manner as the drum 15. In this form of my invention I provide a plurality of circumferentially spaced indexing projections 217—217 which protrude from the periphery of the drum 215 adjacent one end thereof. Said projections may be rounded at their outer ends and may act much like sprocket teeth. Adjacent the opposite end of the drum 215 is provided a plurality of circumferentially spaced indexing projections 219—219 which may be like the projections 217—217 but which are herein shown as being of an elongated formation with the sides thereof converging toward a peak. The projections 217—217 and 219—219 are adapted to engage the underside of the sheet record as it is wrapped around the drum 215 and form indentations therein. These projections and indentations will thus prevent the sheet record from crawling and will show that a recording has been made on a sheet record. These indentations will also assure that the sheet record will always be replaced on the drum 215 in the same relative position it was placed thereon during the recording operation. Spring clips 220—220 are shown as being pivoted to opposite flanges 221—221 of the drum 215 to engage the overlapping end of the sheet record and hold it from unwrapping.

In this form of my invention the sheet record may be fed to the drum 215 in a manner much like that illustrated in a form of my invention shown in Figures 1 through 17. A cylindrical wrapping surface like the inside of the casing 111 may be used to wrap the sheet around the drum 215 and maintain the sheet in wrapped relation with respect thereto. Where a cylindrical surface may be used, the surface itself will press opposite edges of the sheet into engagement with the projections 217 and 219 and will hold the overlapping end of the sheet in engagement with the lapped end of the sheet during the entire recording operation. The spring clips 220—220 may thus be dispensed with.

Where it is not desired to use a cylindrical wrapping surface to wrap the sheet 216 on the drum 215 and to hold its overlapping end from unwrapping, the sheet record record 216 may be wrapped around the cylinder 215 by hand. Opposite edges of the sheet may be pressed down on the projections 217 and 219 to form the gripping and indexing indentations in the record sheet 216. The overlapping end of the sheet record may then be held from unwrapping by means of the spring clips 220—220.

In Figure 20 a pin 225 is shown as projecting from the face of a record carrying drum 226. Such a pin may project from each side of the drum 226 a distance sufficient to engage apertured portions 229—229 formed in the leading end of a sheet record 227 and hold said sheet while being wrapped around the drum 226. The opposite end of the sheet record 227 may then be engaged with spring-biased pins 230—230 extending through apertures 231—231 formed in the sheet and biased to maintain the sheet taut on the drum 226. A pin 230 may be provided on each side of the drum 226 in circumferential alignment with the pins 225—225. Each pin 230 is shown as being pivotally mounted adjacent its inner end on a block 232 within a recessed portion 233 thereof for movement about an axis extending longitudinally of the drum 226. A spring 234 is shown as urging or biasing the pin 230 in a direction to maintain tension on the sheet record 227.

In Figure 22 is shown still another form of means for maintaining the sheet record on its record carrying drum under a slight tension and in aligned relation with respect thereto. In this form of my invention I have shown a record carrying drum 235 having a sheet record 236 wrapped therearound. A block 237 extends inwardly of the drum 235 adjacent each end thereof and has a substantially V-shaped recess 239 formed therein to receive a tension pin 240. Said tension pin is pivotally mounted in said block for movement about an axis extending longitudinally of the drum 235. A spring 241 is shown as being provided to urge the pin 240 in a direction to maintain tension on the sheet record 236. A stationary pin 243 is shown as projecting a slight distance from the face of the drum 235 adjacent each side thereof in circumferential alignment with the pin 240. The pins 243—243 are adapted to engage the ends of slots 244—244 extending along opposite sides of the sheet record 236. The slots 244—244 are of sufficient length that the leading end of the sheet may be engaged with the pins 243—243, and the tension pins 240—240 may extend within the slots 244—244 and freely move therealong. The sheet 236 may then be smoothly wrapped around the drum 235, and slots 245—245 formed in a trailing end of the sheet may be engaged with the tension pins 240—240 to maintain the sheet in wrapped relation with respect to the drum 235 during operation thereof.

It may be seen from the foregoing that a new and improved magnetic recording and reproducing apparatus has been provided utilizing a flat sheet record of paper coated on one of its sides with a magnetizable material and wrapped around the drum 15 in the form of a cylinder during recording and reproducing and that the sheet may readily be wrapped on the drum in aligned relation with respect thereto and with respect to the transducer head and may also readily be removed therefrom upon completion of the recording and may be filed or folded and mailed.

It may further be seen that an improved form of wrapping and aligning means for the sheet record has been provided, enabling a sheet on which a recording has been made to be readily wrapped on the drum with its record track in the same relative position with respect to the transducer head as during the recording operation by virtue of the helical form of opposite diverging edges of the sheet engaging and wrapping members within the wrapping cylinder 111.

It will be understood that modifications and variations may be effected without departing from the scope of the novel concepts of the present invention.

I claim as my invention:

1. In a magnetic recorder utilizing magnetizable sheet records for recording and reproducing purposes, a record carrying drum and means for wrapping the sheet around said drum in centered relation with respect thereto and for holding the sheet in engagement therewith including a cylindrical casing encircling said drum and having its inner periphery uniformly spaced therefrom, a record receiving slot extending along said casing, and sheet wrapping and spreading means spaced radially from said drum and having a soft sheet-engaging surface offering frictional resistance against the sheet record and slidably engageable with the sheet record within said casing and extending therearound and diverging from said slot from a central point with respect to said drum toward the outer sides of the drum.

2. A magnetic recorder utilizing magnetizable sheet records for recording and reproducing purposes comprising a record carrying drum, means for driving said drum, a cylindrical casing encircling said drum and having its inner periphery uniformly spaced therefrom, a record receiving slot extending along said casing, and helical sheet wrapping and spreading means within said casing and extending therearound and diverging from said slot from a central point with respect to said drum toward the outer sides of said drum, a shoe pivotally mounted on said casing for movement into engagement with said drum, and having a soft friction offering record-engaging material on the inner side thereof having generally helical outer edges diverging from a central position with respect to said shoe, manually operable means selectively operable to move said shoe out of engagement with said drum, and a rotatable cam rotatably driven by the means for driving said drum and releasing said shoe to engage said record-engaging material with the sheet record and wrap it around said drum in aligned relation with respect to said drum by the frictional resistance offered against the sheet record.

3. In a magnetic recorder utilizing magnetizable sheet records for recording and reproducing purposes, a record carrying drum, drive mechanism selectively operable to drive said drum, and a helical guide member spaced radially from said drum having a soft friction offering record-engaging, aligning and spreading portion extending from a position in alignment with the transverse center of said drum at opposite helical angles around the periphery thereof in the direction of rotation thereof and engageable with the outer side of a loose magnetizable sheet to wrap the sheet around said drum and align the sheet with the edges of said drum for recording purposes to position the sheet in the same relative position for reproduction purposes as for recording purposes.

4. In a magnetic recorder utilizing magnetizable sheet records for recording and reproducing purposes, a record carrying drum, drive mechanism selectively operable to drive said drum, a wrapping shoe having a wrapping portion spaced radially from the periphery of said drum and having diverging generally helical edge portions extending from the transverse center of said drum at opposite helical angles, and means controlled by rotation of said drum for moving said shoe into engagement with the outer side of a loose magnetizable record sheet to align the sheet with the edges of the drum for recording purposes and to position said sheet on said drum so the recording track thereof will be continuous and in alignment with a transducer head for reproduction purposes.

5. In a magnetic recorder utilizing magnetizable sheet records for recording and reproducing purposes, a record carrying drum, drive mechanism selectively operable to drive said drum, means selectively operable to move a transducer head axially of said drum, a casing spaced radially from and encircling said drum, and helical wrapping means within said casing spaced radially from said drum and conforming to the periphery thereof and extending at opposite helix angles from the center of said drum and including a sheet of soft friction offering material having slidable engagement with a loose magnetizable record sheet to wrap the sheet around said drum and align the sheet with the edges of said drum for recording purposes and position the sheet on said drum with the record track thereof continuous and in alignment with a transducer head for reproduction purposes.

6. In a magnetic recorder utilizing magnetizable sheet records for recording and reproducing purposes, a record carrying drum, drive mechanism selectively operable to drive said drum, a casing spaced radially from and encircling said drum and having a record sheet receiving slot extending therealong and opening to said drum, helical wrapping means within said casing in radial spaced relation with respect to said drum and cooperating with said drum to wrap the sheet therearound and index the sheet with respect to said drum, a sheet engaging shoe pivotally connected to said casing for movement into engagement with the sheet having an inner soft friction offering surface diverging from the center thereof for engagement with the sheet, means selectively operable to hold said shoe out of engagement with the sheet, and means operable by rotation of said drum to release said shoe to come into engagement with the sheet and wrap the sheet around said drum upon rotation thereof.

7. In a magnetic recorder utilizing magnetizable sheet records, a record carrying drum, drive mechanism selectively operable to drive said drum, a casing spaced radially from and encircling said drum and having a record sheet receiving slot extending therealong and opening to said drum, helical wrapping means within said casing cooperating with said drum to wrap the sheet therearound and index the sheet with respect to said drum, a sheet engaging shoe pivoted to said casing for movement around an axis parallel to the axis of rotation of said drum and having a sheet engaging member of a resilient material mounted thereon and conforming to the form of said drum, said helical wrapping means including resilient material the edges of which are formed at opposite helix angles diverging from a central point adjacent said slot, means selectively operable to hold said shoe out of engagement with the sheet, and means operable by rotation of said drum to release said shoe to come into engagement with the sheet and wrap and guide the sheet around said drum.

8. In a magnetic recorder utilizing magnetizable sheet records, a record carrying drum, drive mechanism selectively operable to drive said drum, a casing spaced radially from and encircling said drum and having a record sheet receiving slot extending therealong and opening to said drum, a sheet engaging shoe pivoted to said casing for movement around an axis parallel to the axis of rotation of said drum and having a sheet engaging member of a soft material mounted thereon, the edges of which are formed at opposite helix angles diverging from a central point adjacent said slot, means selectively operable to hold said shoe out of engagement with said drum, and means operable by rotation of said drum to release said shoe to come into engagement with the sheet and said casing having on its inner periphery a soft sheet engaging material thereon, the outer edges of which form continuations of the helix angles of said sheet engaging member on said shoe and cooperate with said shoe and drum to spread the sheet along and uniformly wrap the sheet around said drum and index it with respect to said drum.

9. In a magnetic recorder utilizing magnetizable sheet records, a record carrying drum adapted to have a sheet record wound thereon, drive mechanism selectively operable to drive said drum, wrapping means cooperating with said drum to spread the sheet across and wrap it therearound and index the sheet with respect to said drum including a sheet engaging shoe registering with the transverse center of said drum and pivotally mounted for movement about an axis parallel to the axis of rotation of said drum, said shoe having a sheet engaging member on its inner face of a soft material of a lesser coefficient of friction than the coefficient of friction of the face of said drum, the edges of which are formed at opposite helix angles diverging from the transverse center of said drum, manually operable means selectively operable to move said shoe away from said drum, and means operable upon rotation of said drum to release said shoe to come into engagement with said drum and the sheet thereon.

10. In a magnetic recorder utilizing magnetizable sheet records, a drum adapted to have a sheet record wound thereon, driving mechanism electively operable to drive said drum, wrapping means cooperating with said drum to wrap the sheet therearound and index the sheet with respect to said drum and a sheet engaging shoe registering with the transverse center of said drum and pivoted for movement about an axis parallel to the axis of rotation of said drum, said shoe having a sheet engaging member of a soft friction material of a lesser coefficient of friction than the coefficient of friction of the face of said drum mounted on its inner face, yieldable means holding said shoe into engagement with the sheet, manually operable means selectively operable to move and hold said shoe out of engagement with the sheet, and cam means operable by operation of a means for moving a recording and reproducing means axially of said drum to release said shoe to come into engagement with the sheet.

11. In a magnetic recorder utilizing magnetizable sheet records, a drum, drive mechanism selectively operable to drive said drum, a casing encircling said drum and having a record sheet receiving slot extending therealong and opening to said drum, helical guide and wrapping means within said casing cooperating with said drum to wrap a sheet therearound and hold it in engagement therewith and index the sheet with respect to said drum to assure registry of a recording and reproducing means with the sound tracks on said sheet for reproduction purposes, a sheet engaging shoe registering with the transverse center of said drum and pivoted to said casing for movement about an axis parallel to the axis of rotation of said drum, said shoe having a sheet engaging member on its inner face of a soft material of a lesser coefficient of friction than the coefficient of friction of the face of said drum, the edges of which are formed at opposite helix angles diverging from the transverse center of said drum, means manually operable to move and hold said shoe away from said drum, and means operable upon rotation of said drum to release said shoe to come into engagement with said drum and the sheet thereon, and said helical guide and wrapping means including a soft sheet engaging material mounted on said casing and having substantially the same coefficient of friction as the member on said shoe, the outer edges of which form continuations of the helix angles of the member on said shoe and cooperating with said shoe and drum to wrap the sheet around said drum and index it with respect to said drum.

12. In a magnetic recorder, a drum, drive mechanism selectively operable to drive said drum, a casing spaced radially from and encircling said drum and having a sheet receiving slot extending therealong and opening to said drum, helical guide and wrapping means within said casing cooperating with said drum to wrap a sheet therearound and index the sheet with respect to a recording and reproducing transducer head, a sheet engaging shoe registering with the transverse center of said drum and pivoted to said casing for movement about an axis parallel to the axis of rotation of said drum, said shoe having a sheet engaging member on its inner face of a relatively soft material of a lesser coefficient of friction than the coefficient of friction of the face of said drum, the edges of which are formed at opposite helix angles diverging from the transverse center of said drum, said helical guide and wrapping means including a relatively soft friction sheet engaging material mounted in said casing and having substantially the same coefficient of friction as the member on said shoe, the outer edges of which form continuations of the helix angles of the sheet engaging member on said shoe, yieldable means holding said shoe into engagement with the sheet, manually operable means selectively operable to move and hold said shoe out of engagement with the sheet, and cam means operable by operation of means for moving a transducer head axially of said drum to release said shoe to come into engagement with the sheet.

13. A magnetic recorder comprising a frame, a drum journalled thereon for rotation about a horizontal axis, a motor, a selectively operable drive connection from said motor to said drum, an electromagnetic transducer head mounted for translational movement along said drum, a lead screw, a drive connection from the means for driving said drum for rotatably driving said lead screw, means engageable with the threads of said screw for translationally moving said transducer head along the face of said drum during rotation thereof, a casing encircling said drum and having its inner periphery spaced radially therefrom and having a magnetizable sheet receiving slot extending therealong and opening to said drum, and wrapping means within said casing slidably engageable with the outer side of a sheet and cooperating with said drum to wrap a sheet therearound and index the sheet with respect to said transducer head to assure a continuous record track and registry of said transducer head with the sound track on said sheet for reproduction purposes and including a sheet engaging member within said casing of a relatively soft material of a lesser coefficient of friction than the coefficient of friction of the face of said drum and having edges formed at opposite helical angles diverging from a central portion adjacent said sheet receiving slot.

14. In a magnetic recorder utilizing magnetizable record sheets, a frame, a drum journalled thereon, a motor mounted thereon, drive connection from said motor to said drum, sheet wrapping means conforming to the form of said drum and engageable with the outer side of the sheet and cooperating with said drum to wrap the sheet therearound and hold it in engagement therewith and having a sheet receiving slot therein, a sheet engaging shoe registering with the transverse center of said drum and pivoted for movement about an axis parallel to the axis of rotation of said drum, said shoe having a sheet engaging member mounted on its inner face of a soft material of a lesser coefficient of friction than the coefficient of friction of the face of said drum, the edges of which are formed at opposite helix angles diverging from a central position adjacent said sheet receiving slot to engage and align and cause the sheet to adhere to said drum, a yieldable member urging the shoe into engagement with said sheet, a manually operable member operatively connected with said shoe and movable to disengage said shoe from the sheet and to hold the shoe in disengagement with the sheet against said yieldable member, and a rotatable cam operable to engage said manually operable member and release said yieldable member to engage said shoe with the sheet upon rotation of said drum.

15. In a magnetic recorder utilizing magnetizable record sheets, a frame, a drum journalled thereon for rotation about a horizontal axis, a motor, a drive connection from said motor to said drum, a sheet wrapping member encircling said drum and having a sheet-receiving slot therein, means for guiding a sheet to said drum, a sheet engaging shoe registering with the transverse center of said drum and pivoted for movement about an axis parallel to the axis of rotation of said drum, said shoe having a sheet engaging member of a relatively soft material of a lesser coefficient of friction than the coefficient of friction of the face of said drum mounted on its inner face, the edges of which are formed at opposite helix angles diverging from a position adjacent said slot, a manually operable member operatively connected with said shoe and movable to disengage said shoe from the sheet, and yieldable means releasable to engage said shoe with the sheet upon rotation of said drum, said sheet wrapping member having a relatively soft sheet engaging material conforming to the form of said drum and of substantially the same coefficient of friction as the friction material on said shoe, the outer edges of which form continuations of the helix angle of the engaging member on said shoe and cooperate with said shoe and drum to wrap the sheet around said drum and index the sheet with respect to said drum.

16. In a magnetic recorder having a frame, a drum journalled thereon and adapted to have a record sheet wound thereon, a motor for driving said drum, the improvement comprising a sheet engaging shoe pivotally mounted for movement to engage the leading end of the sheet with said drum, a yieldable member urging said shoe into position to engage the leading end of the sheet with said drum, a rocking member positively moving said shoe against said yieldable member and holding said shoe in disengagement with the sheet, a manually operable cam member slidably mounted on said rocking member and selectively operable to move said rocking member against said yieldable member and pivot said shoe to a disengaged position, and a rotatable cam driven by the means for driving said drum and engageable with said first cam and moving said first cam in a direction to release said rocking member and effect engagement of said shoe with said drum and wrap a record sheet therearound upon rotation of said drum.

17. In a magnetic recorder having a frame, a record carrying drum journalled thereon and adapted to have a magnetizable record sheet wound thereon, a motor for driving said drum, the improvement comprising a sheet engaging shoe pivotally mounted for movement into engagement with the leading end of the sheet as it initially engages said drum, a yieldable member operatively connected with said shoe and urging said shoe into engagement with the face of said drum and the sheet thereon, a rocking member operatively connected with said shoe and positively moving said shoe out of engagement with said drum against said yieldable member, a shaft parallel to the axis of rotation of said drum, a gear thereon for driving said shaft, a rotatable abutment member on said shaft, a cam member mounted on said rocking member for translational movement with respect thereto, manually operable means for moving said cam member toward said abutment member and outwardly along the face thereof onto the periphery thereof and thereby moving said rocking member against said yieldable member to move said shoe out of engagement with said drum, and a cam rotatably driven by said gear and engageable with said cam member to move said cam member out of engagement with said abutment member and releasing said yieldable member to move said rocking member and shoe into engagement with said drum.

18. In a magnetic recorder having a frame, a record carrying drum journalled thereon and adapted to have a magnetizable record sheet wound thereon, a motor for driving said drum, the improvement comprising a sheet engaging shoe pivotally mounted for movement into engagement with the leading end of the sheet as it initially engages said drum, a yieldable member operatively connected with said shoe and urging said shoe into engagement with the face of said drum and the sheet thereon, a rocking member operatively connected with said shoe and positively moving said shoe out of engagement with said drum against said yieldable member, a shaft parallel to the axis of rotation of said drum, a gear thereon for driving said shaft and having a hub having a recess extending around the periphery thereof, a conical cam member mounted on said rocking member for slidable movement with respect thereto and having its apex facing said hub and having a bead extending around its base, manually operable means for moving said cam member into engagement with said hub and outwardly with respect thereto by virtue of the inclined face of said cam member and onto the periphery of said hub and engaging said bead with said recess to lock said cam member to rotate with said hub and lock said shoe in a disengaged position, and a cam on said gear engageable with said conical cam member and moving said cam member out of engagement with said recess and hub and releasing said rocking member and yieldable member to yieldably engage said shoe with said drum.

19. In a magnetic recorder having a frame, a record carrying drum journalled thereon and adapted to have a magnetizable record sheet wound thereon, a motor for driving said drum and the improvement comprising wrapping means encircling said drum and means for guiding a record sheet to said drum, a sheet engaging shoe pivotally mounted for movement into engagement with the leading end of the sheet to initially wrap the sheet around said drum, a yieldable member operatively connected with said shoe and urging said shoe into engagement with said drum and the sheet thereon, a rocking member operatively connected with said shoe and positively moving said shoe out of engagement with said drum against said yieldable member, a shaft parallel to the axis of rotation of said drum, a gear thereon for driving said shaft, a rotatable abutment member on said shaft, a conical cam member slidably mounted on said rocking member, manually operable means for moving said cam member along said rocking member toward said abutment member and outwardly along the face thereof onto the periphery thereof to move said rocking member against said yieldable member and pivot said shoe out of engagement with said drum, and a cam rotatably driven by said gear and engageable with said cam member to move said cam member out of engagement with said abutment member in cooperation with said yieldable member and releasing said rocking member and yieldable member to yieldably engage said shoe with said drum.

References Cited in the file of this patent

UNITED STATES PATENTS

| | | |
|---|---|---|
| 626,490 | Emmerich | June 6, 1899 |
| 873,084 | Poulsen | Dec. 10, 1907 |
| 1,075,697 | Cox | Oct. 14, 1913 |
| 1,635,197 | Tufts | July 12, 1927 |
| 1,673,521 | Maas | June 12, 1928 |
| 1,901,306 | Knowlton | Mar. 14, 1933 |
| 2,064,993 | Sperry | Dec. 22, 1936 |
| 2,172,431 | Bender | Sept. 12, 1939 |
| 2,431,360 | Philpott | Nov. 25, 1947 |
| 2,435,260 | Wise | Feb. 3, 1948 |
| 2,443,756 | Williams et al. | June 22, 1948 |
| 2,451,080 | Finch | Oct. 12, 1948 |
| 2,530,029 | Pond | Nov. 14, 1950 |
| 2,536,029 | Camras | Jan. 2, 1951 |
| 2,695,785 | Dashiell | Nov. 30, 1954 |

FOREIGN PATENTS

| | | |
|---|---|---|
| 960,325 | France | Oct. 24, 1949 |